United States Patent
Baghel et al.

(10) Patent No.: US 11,831,572 B2
(45) Date of Patent: *Nov. 28, 2023

(54) VEHICLE-TO-EVERYTHING (V2X) INTER-USER EQUIPMENT (UE) COORDINATION

(71) Applicant: QUALCOMM Incorporated, San Diego, CA (US)

(72) Inventors: Sudhir Kumar Baghel, Hillsborough, NJ (US); Gabi Sarkis, San Diego, CA (US); Kapil Gulati, Belle Mead, NJ (US); Seyedkianoush Hosseini, San Diego, CA (US); Junyi Li, Chester, NJ (US); Wanshi Chen, San Diego, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 17/175,561

(22) Filed: Feb. 12, 2021

(65) Prior Publication Data
US 2021/0258114 A1    Aug. 19, 2021

Related U.S. Application Data

(60) Provisional application No. 62/976,214, filed on Feb. 13, 2020.

(51) Int. Cl.
*H04W 52/02*    (2009.01)
*H04W 72/04*    (2023.01)
(Continued)

(52) U.S. Cl.
CPC ............. *H04L 5/0035* (2013.01); *H04W 4/40* (2018.02); *H04W 72/542* (2023.01); *H04W 74/0808* (2013.01); *H04W 76/14* (2018.02)

(58) Field of Classification Search
CPC ..... H04W 4/40; H04W 56/001; H04W 16/14; H04W 4/44; H04W 4/46; H04W 4/70;
(Continued)

(56) References Cited

U.S. PATENT DOCUMENTS

2016/0295624 A1    10/2016  Novlan et al.
2019/0075597 A1    3/2019   Yerramalli et al.
(Continued)

FOREIGN PATENT DOCUMENTS

CN    110392988 A    10/2019
WO    2019036578 A1    2/2019

OTHER PUBLICATIONS

HHTF., et al., "Designs for NR V2X Mode 2 Resource Allocation," 3GPP Draft, 3GPP TSG RAN WG1 Meeting AH1901, R1-1900356_V2X_MODE2RA, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593270, 10 pages, Retrieved from the Internet: URL: http://www.3gpp.org/ftp/Meetings%5F3GPP%5FSYNC/RAN1/Docs/R1%2D1900356%2Ezip [retrieved on Jan. 20, 2019].
(Continued)

*Primary Examiner* — Awet Haile
(74) *Attorney, Agent, or Firm* — Seyfarth Shaw, LLP

(57) ABSTRACT

A method of wireless communication performed by a sensing user equipment (UE) includes identifying available resources during a sensing window. The method also includes receiving a request to share the available resources with a transmitter UE. The method further includes determining the sensing UE satisfies a sharing condition. The method still further includes sharing the available resources with the transmitter UE based on satisfying the sharing condition.

28 Claims, 8 Drawing Sheets

(51) Int. Cl.
*H04W 76/11* (2018.01)
*H04W 72/02* (2009.01)
*H04W 92/18* (2009.01)
*H04L 5/00* (2006.01)
*H04W 4/40* (2018.01)
*H04W 74/08* (2009.01)
*H04W 76/14* (2018.01)
*H04W 72/542* (2023.01)

(58) Field of Classification Search
CPC ......... H04W 56/0015; H04W 56/0025; H04W 48/20; H04W 72/005; H04W 72/02; H04W 72/044; H04W 72/0446; H04W 72/085; H04W 72/12; H04W 72/14; H04W 74/0808; H04W 76/11; H04W 92/18; H04L 5/0035; H04L 5/0058
See application file for complete search history.

(56) References Cited

U.S. PATENT DOCUMENTS

| | | | | |
|---|---|---|---|---|
| 2020/0267523 | A1* | 8/2020 | Tang | H04L 5/001 |
| 2021/0051654 | A1* | 2/2021 | Wang | H04W 72/12 |
| 2021/0068101 | A1* | 3/2021 | Chen | H04L 1/0061 |
| 2021/0160810 | A1* | 5/2021 | Zhang | G01S 5/10 |
| 2021/0212026 | A1* | 7/2021 | Peng | H04W 4/40 |
| 2021/0219268 | A1* | 7/2021 | Li | H04L 1/08 |
| 2021/0258920 | A1 | 8/2021 | Baghel et al. | |
| 2021/0306824 | A1* | 9/2021 | Li | H04W 4/40 |
| 2021/0314750 | A1* | 10/2021 | Nguyen | H04W 72/1242 |
| 2021/0360520 | A1* | 11/2021 | Chen | H04W 76/11 |
| 2022/0110095 | A1* | 4/2022 | Zhao | H04W 72/02 |
| 2022/0167362 | A1* | 5/2022 | Liu | H04W 74/08 |

OTHER PUBLICATIONS

International Search Report and Written Opinion—PCT/US2021/018195—ISA/EPO—dated May 26, 2021.
Mediatek Inc: "On Sidelink Resource Allocation Mechanism", 3GPP Draft, 3GPP TSG RAN WG1 Meeting #95, R1-1812367_ON Sidelink Resource Allocation Mechanism, 3rd Generation Partnership Project (3GPP), Mobile Competence Centre, 650, Route Des Lucioles, F-06921, Sophia-Antipolis Cedex, France, vol. RAN WG1, No. Spokane, USA, Nov. 12, 2018-Nov. 16, 2018, Nov. 11, 2018 (Nov. 11, 2018), XP051554276, 10 pages, Retrieved from the Internet: URL: http://www.3gpp.org/ftp/Meetings%5F3GPP%5FSYNC/RAN1/Docs/R1%2D1812367%2Ezip [retrieved on Nov. 11, 2018].

* cited by examiner

VEHICLE-TO-EVERYTHING (V2X) INTER-USER EQUIPMENT (UE) COORDINATION

CROSS-REFERENCE TO RELATED APPLICATION

The present application claims priority to U.S. Provisional Patent Application No. 62/976,214, filed on Feb. 13, 2020, and entitled "NEW RADIO (NR) VEHICLE-TO-EVERYTHING (V2X) INTER-USER EQUIPMENT (UE) COORDINATION," the disclosure of which is expressly incorporated by reference in its entirety.

FIELD OF THE DISCLOSURE

Aspects of the present disclosure generally relate to wireless communication, and more particularly, to techniques and apparatuses for vehicle-to-everything (V2X) inter-user equipment (UE) coordination.

BACKGROUND

Wireless communication systems are widely deployed to provide various telecommunications services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communication (mMTC), and ultra reliable low latency communication (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communication systems may include, or provide support for, various types of communication systems, such as vehicle related communication systems (e.g., vehicle-to-everything (V2X) communication systems). Vehicle related communication systems may be used by vehicles to increase safety and prevent vehicle collisions. Information about inclement weather, nearby accidents, road conditions, and/or other information may be conveyed to a driver via the vehicle related communication system. In some cases, vehicles may communicate directly with each other using device-to-device (D2D) communication over a D2D wireless link.

As the demands for vehicle related communication increase, different V2X communication systems compete for the same wireless communication resources. Accordingly, there is a need to improve the sharing of wireless communication resources.

SUMMARY

In one aspect of the present disclosure, a method for wireless communication performed by a sensing user equipment (UE) includes identifying available resources during a sensing window. The method further includes receiving a request to share the available resources with a transmitter UE. The method still further includes determining the sensing UE satisfies a sharing condition. The method also includes sharing the available resources with the transmitter UE based on satisfying the sharing condition.

Another aspect of the present disclosure is directed to an apparatus for wireless communication at a sensing UE. The apparatus includes means for identifying available resources during a sensing window. The apparatus further includes means for receiving a request to share the available resources with a transmitter UE. The apparatus still further includes means for determining the sensing UE satisfies a sharing condition. The apparatus also includes means for sharing the available resources with the transmitter UE based on satisfying the sharing condition.

In another aspect of the present disclosure, a non-transitory computer-readable medium with non-transitory program code recorded thereon for wireless communication at a sensing UE is disclosed. The program code is executed by a processor and includes program code to identify available resources during a sensing window. The program code further includes program code to receive a request to share the available resources with a transmitter UE. The program code still further includes program code to determine the sensing UE satisfies a sharing condition. The program code also includes program code to share the available resources with the transmitter UE based on satisfying the sharing condition.

Another aspect of the present disclosure is directed to an apparatus for wireless communications at a sensing UE, comprising a processor, a memory coupled with the processor, and instructions stored in the memory and operable, when executed by the processor, to cause the apparatus to identify available resources during a sensing window. The instructions further cause the apparatus to receive a request to share the available resources with a transmitter UE. The instructions still further cause the apparatus to determine the sensing UE satisfies a sharing condition. The instructions also cause the apparatus to share the available resources with the transmitter UE based on satisfying the sharing condition.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
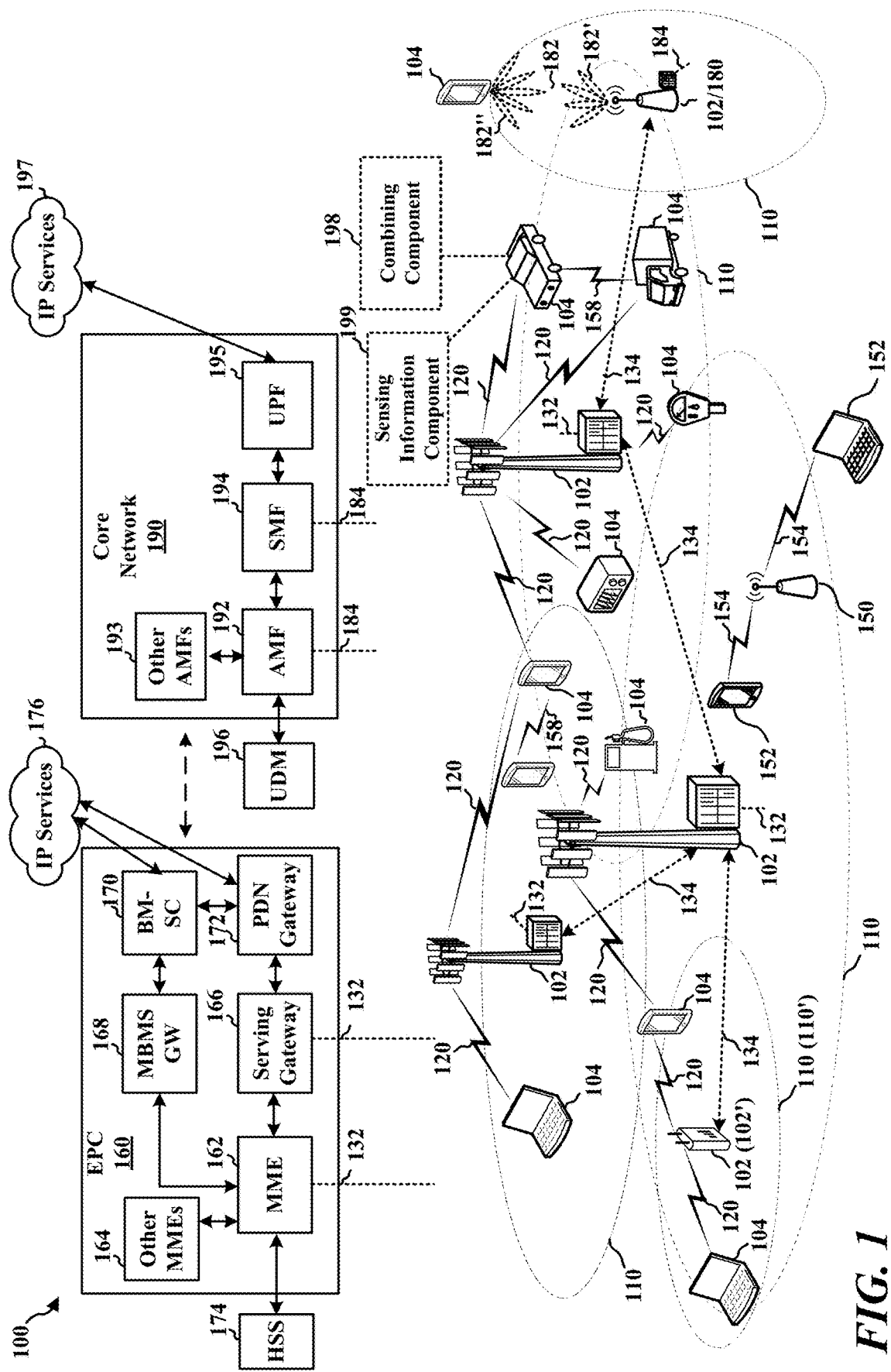
FIG. 1 is a diagram illustrating an example of a wireless communication system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communication systems, such as and including 3G and/or 4G technologies.

In cellular communication networks, wireless devices may generally communicate with each other via one or more network entities, such as a base station or scheduling entity. Some networks may support device-to-device (D2D) communication to enable discovery of, and communication with, nearby devices using a direct link between devices (e.g., without passing through a base station, relay, or another node). D2D communication may enable mesh networks and device-to-network relay functionality. Some examples of D2D technology include Bluetooth pairing, Wi-Fi Direct, Miracast, and LTE-D. D2D communication may also be referred to as point-to-point (P2P) or sidelink communication.

D2D communication may be implemented using licensed or unlicensed bands. Additionally, D2D communication may avoid the overhead associated with routing transmissions to and from the base station. Therefore, D2D communication may improve throughput, reduce latency, and/or increase energy efficiency.

Vehicle-to-everything (V2X) communication is an example of a type of D2D communication. For example, V2X communication may provide non-line of sight communication capabilities to autonomous vehicles. In one example, when two vehicles approach an intersection, various bits of information gathered by the sensors of the two vehicles may be shared via V2X communication. The information may be shared even when the two vehicles do not have a direct line of sight path to each other. Also, a vehicle with V2X communication capabilities may share information gathered by the vehicle's sensors with other vehicles or devices within a communication coverage area. The sensors may include, for example, light detection and ranging (LiDAR), radar, cameras, etc. In most cases, the vehicle's sensors are line of sight sensors.

To improve sidelink transmission reliability, UEs may inter-coordinate to share resource information. As an example, a first UE may perform a sensing operation to identify communication resources. The communication resources identified by the first UE may be referred to as sensing information. In this example, the first UE may transmit the sensing information (e.g., identified communication resources) to a second UE. The second UE may consider the sensing information when selecting resources for a sidelink transmission. Additionally, in this example, the second UE may also perform measurements to identify communication resources. As such, the second UE may pool the sensing information with its own identified communication resources. Aspects of the present disclosure are directed to improving inter-UE coordination. In the current disclosure, the first UE may also be referred to as a sensing UE or a partner UE, and the second UE may be referred to as transmitter UE.

FIG. 1 is a diagram illustrating an example of a wireless communication system and an access network 100. The wireless communication system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., Si interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communication systems, such as for example, FlashLinQ, WiMedia, Bluetooth, ZigBee, Wi-Fi based on the IEEE 802.11 standard, LTE, or NR.

The wireless communication system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communication using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting eMBMS related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a combining component 198 configured to determine whether to combine the received sensing information with sensing information obtained from its own measurements. Additionally, or alternatively, the UE 104 may include a sensing information component 199 configured to identify available resources during a sensing window. The sensing information component 199 may also be configured to receiving a request to share resource information with another UE 104. The sensing information component 199 may further be configured to determining whether the UE 104 is configured to share the resource information. That is, the sensing information component 199 may be configured to determine whether the UE 104 satisfies a sharing condition. The sensing information component 199 may further be configured to share the available resources with the other UE 104 when the UE 104 satisfies the sharing condition.

Although the following description may be focused on 5G NR, the herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. A physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) acknowledgment/negative acknowledgment (ACK/NACK) feedback. The PUSCH carries data, and may additionally be used to carry a buffer status report (BSR), a power headroom report (PHR), and/or UCI.

Figure 3:
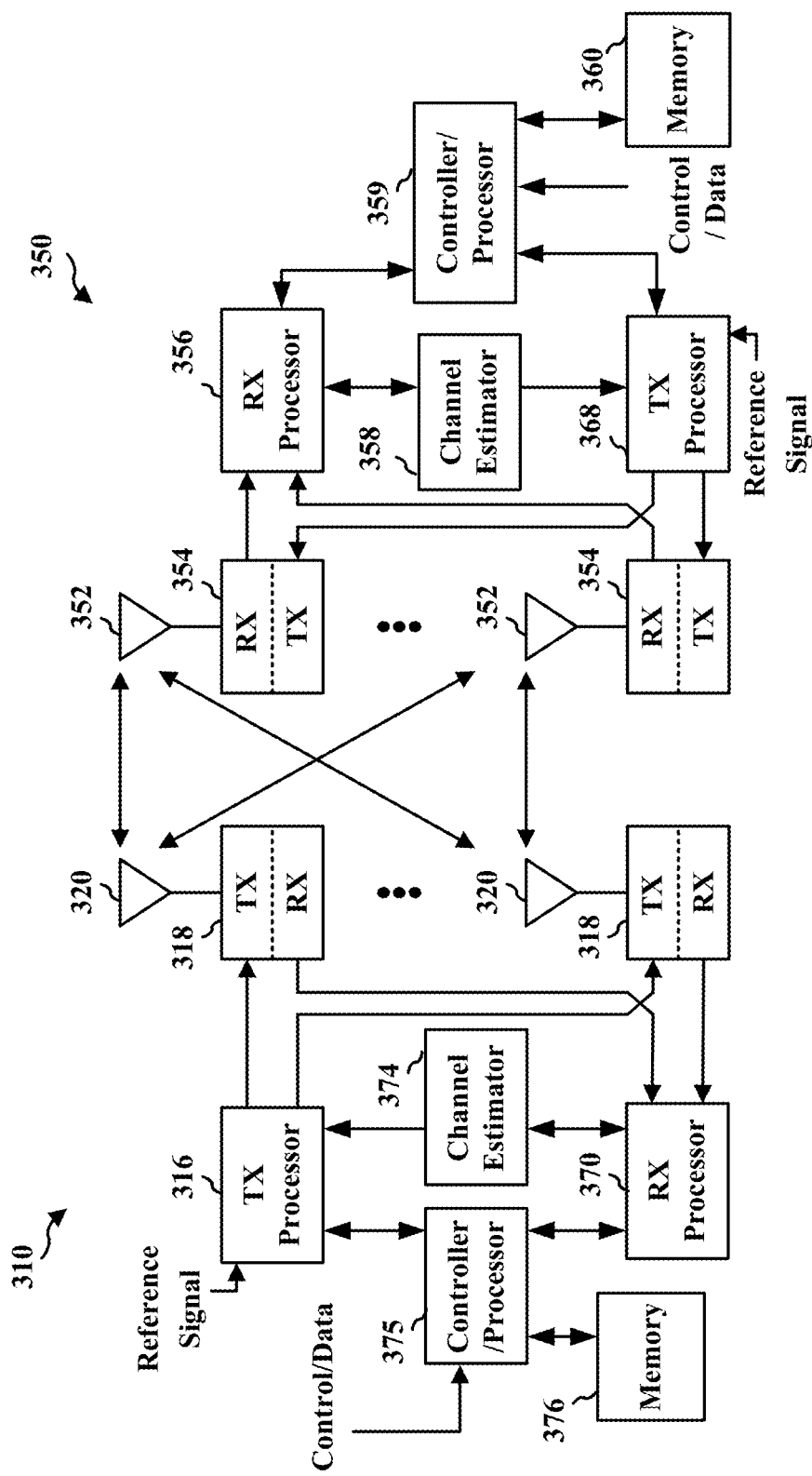
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to an RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the combining component 198 and/or the sensing information component 199 of FIG. 1. Additionally, at least one of the TX processor 316, the RX processor 370, and the controller/processor 375 may be configured to perform aspects in connection with the combining component 198 and/or the sensing information component 199 of FIG. 1.

Figure 4:
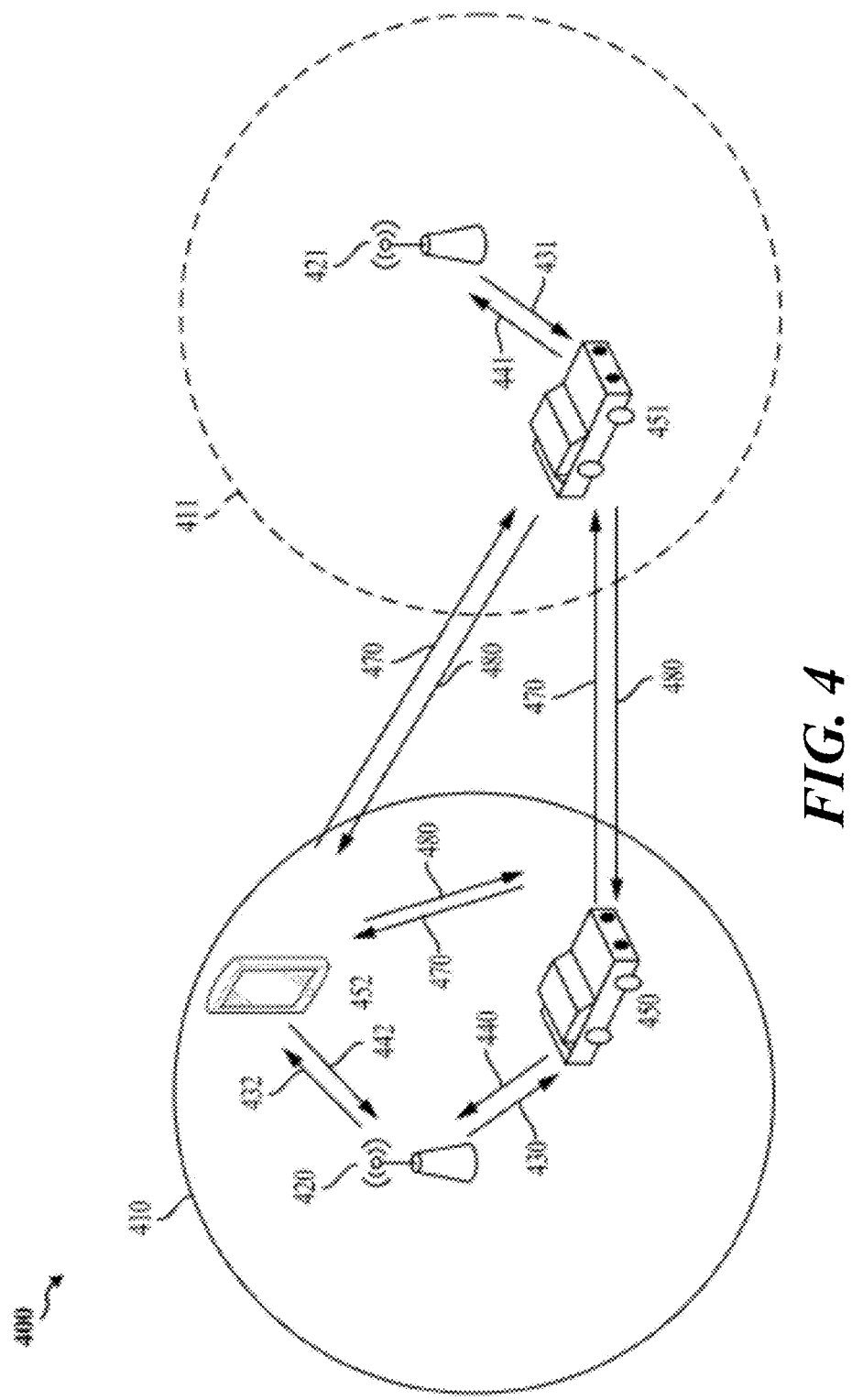
FIG. 4 is a diagram illustrating an example of a vehicle-to-everything (V2X) system, in accordance with various aspects of the present disclosure.

FIG. 4 is a diagram of a device-to-device (D2D) communication system 400, including V2X communication, in accordance with various aspects of the present disclosure. For example, the D2D communication system 400 may include V2X communication, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communication, including new radio (NR), LTE, LTE-Advanced, licensed assisted access (LAA), dedicated short range communication (DSRC), MuLTEFire, 4G, and the like. The foregoing list of technologies is to be regarded as illustrative, and is not meant to be exhaustive.

The D2D communication system 400 may use NR radio access technology. Of course, other radio access technologies, such as LTE radio access technology, may be used. In D2D communication, such as V2X communication or vehicle-to-vehicle (V2V) communication, the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communication between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communication. In some aspects, D2D communication (e.g., sidelink communication) between or among UEs 450, 451 are not scheduled by MNOs. The D2D communication system 400 may further include a third UE 452.

The third UE 452 may operate on the first network 410 (e.g., of the first MNO or another network, for example. The third UE 452 may be in D2D communication with the first UE 450 and/or second UE 451. The first base station 420 (e.g., gNB) may communicate with the third UE 452 via a downlink (DL) carrier 432 and/or an uplink (UL) carrier 442. The DL communication may use various DL resources (e.g., the DL subframes (FIG. 2A) and/or the DL channels (FIG. 2B)). The UL communication may be performed via the UL carrier 442 using various UL resources (e.g., the UL subframes (FIG. 2C) and the UL channels (FIG. 2D)).

Figure 2:
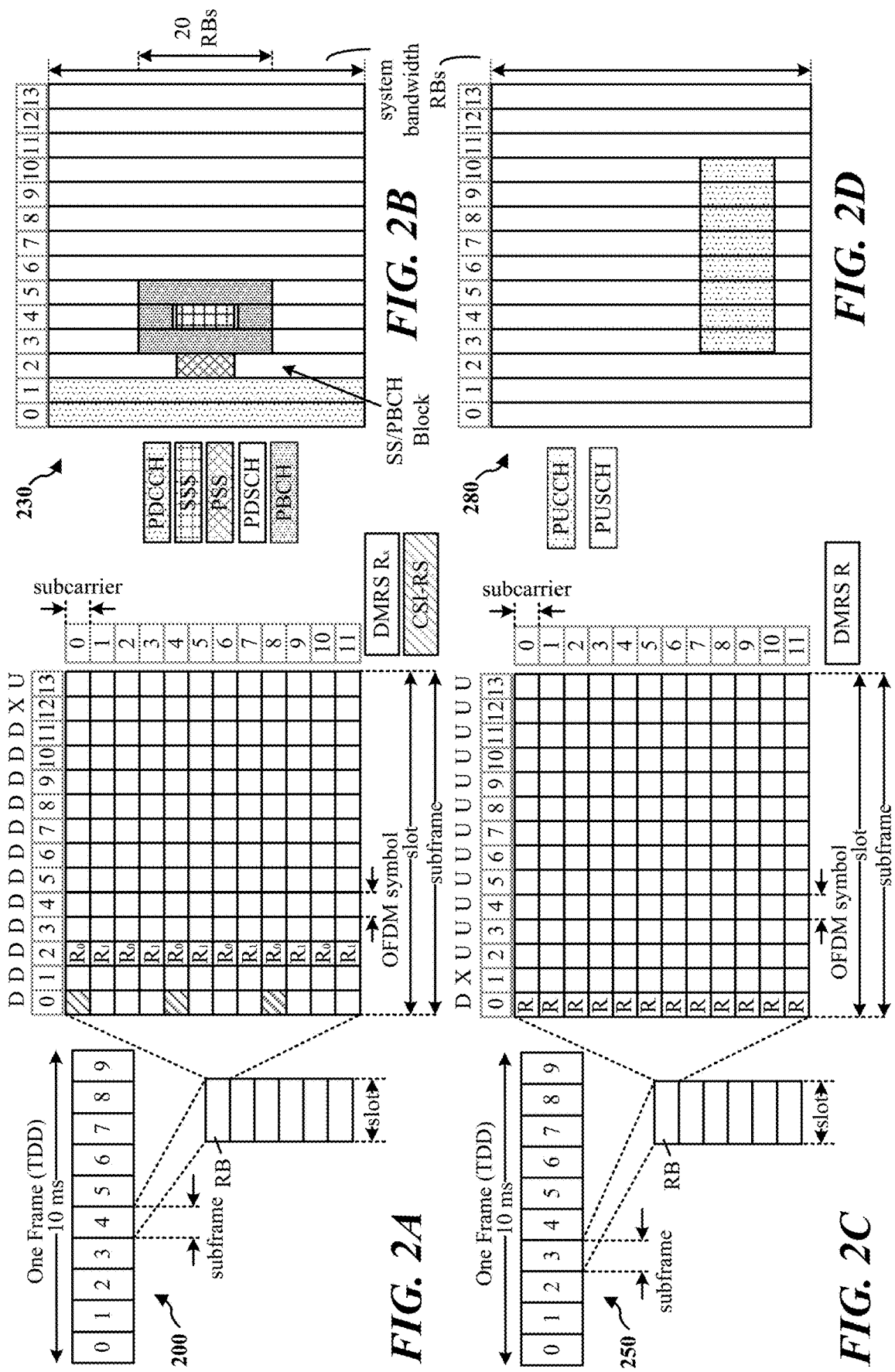
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or a UL carrier 440. The DL communication may use various DL resources (e.g., the DL subframes (FIG. 2A) and/or the DL channels (FIG. 2B)). The UL communication may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include a second base station 421 (e.g., gNB) communicating with the second UE 451, for example, as described in FIGS. 1-3.

The second base station 421 may communicate with the second UE 451 via a DL carrier 431 and a UL carrier 441. The DL communication is performed via the DL carrier 431 using various DL resources (e.g., the DL subframes (FIG. 2A) and/or the DL channels (FIG. 2B)). The UL communication is performed via the UL carrier 441 using various UL resources (e.g., the UL subframes (FIG. 2C) and the UL channels (FIG. 2D)).

In conventional systems, the first base station 420 and/or the second base station 421 assign resources to the UEs for device-to-device (D2D) communication, such as V2X communication or V2V communication. For example, the resources may be a pool of UL resources, both orthogonal (e.g., one or more FDM channels) and non-orthogonal (e.g., code division multiplexing (CDM)/resource spread multiple access (RSMA) in each channel). The first base station 420 and/or the second base station 421 may configure the resources via a PDCCH or an RRC.

In some systems, each UE 450, 451 autonomously selects resources for D2D communication. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the sensing UE or partner UE, which may potentially notify the transmitter UE 450. The transmitter UE 450 may transmit information to the receiving UE 451 via sidelink communication.

The D2D communication may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communication on a sidelink carrier may occur between the first UE 450 and the second UE 451. In an aspect, the first UE 450 may perform sidelink communication with one or more (e.g., multiple) devices, including the second UE 451 via the first sidelink carrier 470. For example, the first UE 450 may transmit a broadcast transmission via the first sidelink carrier 470 to multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communication with one or more (e.g., multiple) devices, including the first UE 450 via the second sidelink carrier 480. For example, the second UE 451 may transmit a broadcast transmission via the second sidelink carrier 480 to multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communication on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communication and/or without scheduling such communication. Sidelink communication may include traffic communication (e.g., data communication, control communication, paging communication, and/or system information communication). Further, sidelink communication may include sidelink feedback communication associated with traffic communication (e.g., transmission of feedback information for previously-received traffic communication). Sidelink communication may employ at least one sidelink communication structure having at least one feedback symbol. The feedback symbol of the sidelink communication structure may allot for any sidelink feedback information that may be communicated in the device-to-device (D2D) communication system 400 between devices (e.g., a first UE 450, a second UE 451, and/or a third UE 452).

As discussed, a UE, such as a transmitter UE, may use sensing information provided by other UEs, such as one or more sensing UEs (e.g., partner UEs), to identify communication resources for sidelink communication (e.g., sidelink transmissions). Additionally, or alternatively, the transmitter UE may obtain sensing information obtained by its own measurements. Thus, in some cases, the transmitter UE may use the sensing information obtained from its own measurements as well as sensing information provided by other UEs. It may be desirable to combine sensing information to reduce collisions, such as collisions caused by half duplex and hidden node issues. The transmitter UE refers to a UE that is searching for communication resources to transmit data to a receiver UE via a sidelink transmission. The receiver UE may be the same or different from a sensing UE.

To reduce network overhead and to improve throughput, it is desirable to specify the type of sensing information that is shared between UEs. Additionally, it is desirable to identify a UE as a candidate for sharing the sensing information based on the UE satisfying a sharing condition. Aspects of the present disclosure specify the type of information that is shared as well as identifying UEs that may share the information based on the UEs satisfying one or more sharing conditions.

In one configuration, a time window (e.g., millisecond or slots) for a future time period is configured for a sensing UE. Based on transmissions scheduled during the time window, the sensing UE may be aware of available and unavailable resources (e.g., channels or sub-channels) in the time window. The time window may be configured via signaling, such as RRC signaling or a SIB, received from a base station or a configuration for an out of coverage operation. A connection failure with the base station is an example of an out of coverage operation. In such an example, the sensing UE operates based on one or more configurations designated for the out of coverage operation. In one configuration, an amount of sensing information shared may correspond to a size of the time window. For example, if a time window is 5 ms, the sensing UE shares information obtained during a 5 ms sensing window.

Figure 5:
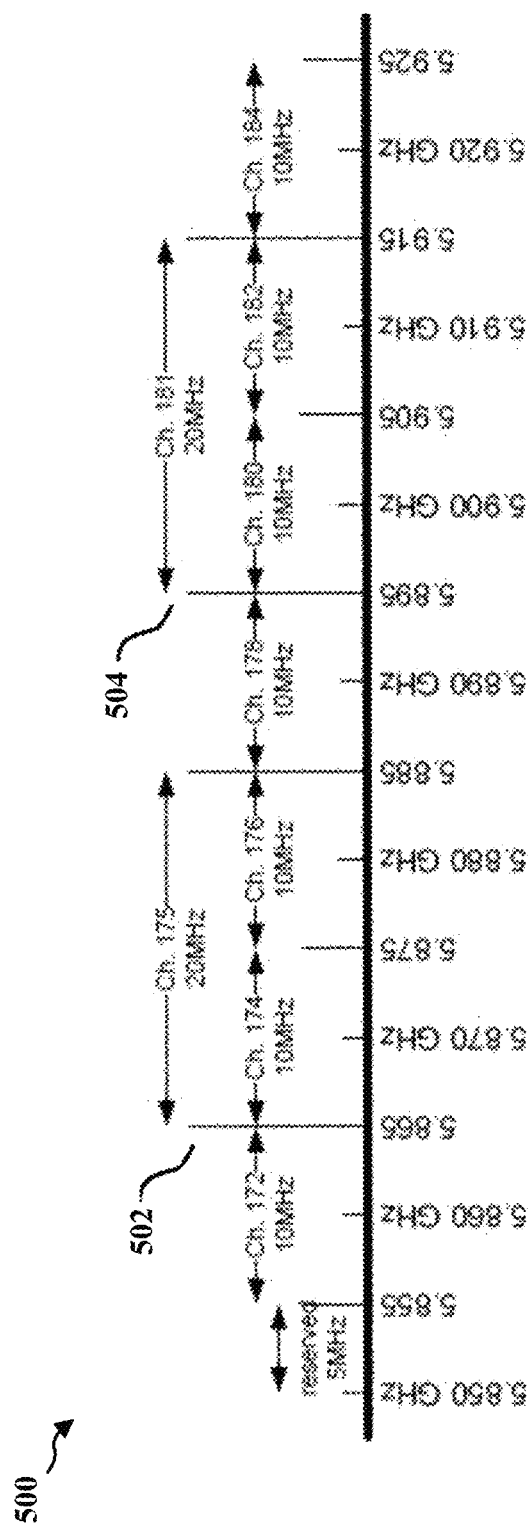
FIG. 5 is a diagram illustrating an example of a radio frequency spectrum, in accordance with various aspects of the present disclosure.

In some aspects, a subchannel is allocated to a UE for V2X communication. FIG. 5 illustrates an example radio frequency spectrum 500 with dedicated portions of radio frequency for V2X communication. In the example of FIG. 5, the spectrum 500 shows a radio frequency range from 5.850 GHz to 5.925 GHz. The spectrum 500 is not limited to 5.850 GHz to 5.925 GHz.

From the radio frequency spectrum 500, one or more sections may be allocated for V2X communication. As an example, a 20 MHz section 502 from 5.865 GHz to 5.885 GHz, and another 20 MHz section 504 from 5.895 GHz to 5.915 GHz may be allocated for V2X communication. Each of the two allocated radio frequency sections 502 and 504 may be divided into multiple subchannels. One or more subchannels may be allocated to vehicle UEs. In one example scenario, the allocated radio frequency sections 502 and 504 may be divided into four individual subchannels of 5 MHz each, for the V2X communication.

Specific radio frequency sections allocated to V2X communication may be jurisdiction specific. For example, the radio frequency sections 502 and 504 are dedicated frequency resources for V2X communication in the United States. Different radio frequency resources may be dedicated to the V2X communication in different jurisdictions.

In one configuration, the sensing information provides per subchannel availability in a time window, such as the time window described above. The per channel availability may be determined based on a per subchannel occupancy. As discussed, different UEs may be allocated different subchannels. Additionally, a transmission from a UE may be scheduled on one or more subchannels at a future time window. Thus, the UE may be aware of a per subchannel availability for the future time window. The sensing information may provide resource availability and unavailability on a per subchannel basis for the future time window. The future time window may be configured via signaling from a base station or pre-configured for an out of coverage operation.

Additionally, or alternatively, sensing information may be shared from resource pools specifically configured for sharing. For example, a first resource pool may not be configured for sharing sensing information and a second resource pool may be configured for sharing sensing information. In this example, UEs may sense resources from both the first pool and the second pool. However, in this example, UEs may only share sensing information from the second pool. The sharing configuration may be signaled from a base station or pre-configured for an out-of-coverage operation.

In one configuration, a transmitter UE is configured for unicast transmissions, such that a sensing UE receives the unicast transmissions from the transmitter UE. In this configuration, the sensing UE satisfies a sharing condition based on the transmitter UE requesting sensing information. Alternatively, the transmitter UE may be configured for connection oriented multicast transmissions. In this example, UEs in a same group as the transmitter UE may share sensing information in response to a request from the transmitter UE.

In another configuration, the transmitter UE is configured for connectionless multicast transmissions. In this configuration, the sensing information is shared when one or more sharing conditions are satisfied. In one example, for connectionless multicast transmissions, a sharing condition may be satisfied when a sensing UE participates in group communication with the transmitter UE. In another example, for the connectionless multicast transmissions, the sharing condition may be satisfied when a received signal power, such as a reference signal received power (RSRP), measured at the sensing UE is greater than a received signal power threshold. In yet another example, for the connectionless multicast transmissions, the sharing condition may be satisfied when a distance between a location of a sensing UE and a location of the transmitter UE is less than a distance threshold. A sensing UE within an indicated distance from the transmitter UE may be referred to as a sensing UE that satisfies a minimum communication requirement.

In one configuration, the transmitter UE is configured for broadcast transmissions. In such configurations, sensing UEs within a received signal power (e.g., RSRP) range (e.g., greater than a first received signal power threshold and less than a second received signal power threshold) may share sensing information with the transmitter UE configured for broadcast transmissions.

In one configuration, a base station (e.g., gNB) transmits a message to a sensing UE designating the sensing UE to share sensing information. In this configuration, only the sensing UEs receiving the sharing designation share sensing information in response to a request received from a transmitter UE. The base station may designate a sensing UE via specific signaling, such as radio resource control (RRC) signaling.

Figure 6:
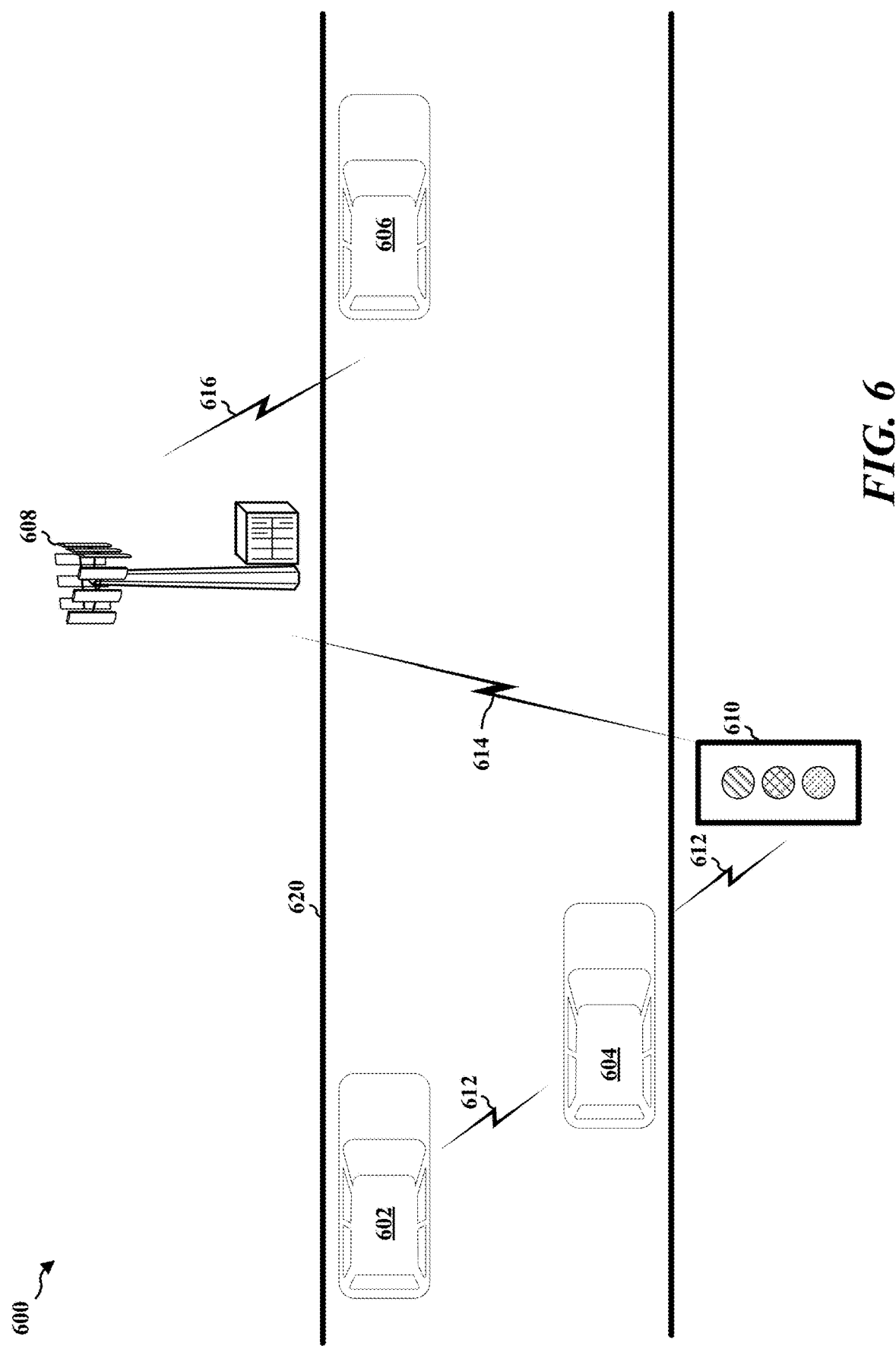
FIG. 6 is a diagram illustrating an example of a vehicle-to-everything (V2X) system, in accordance with various aspects of the present disclosure.

In yet another configuration, specific types of UEs, such as a roadside unit (RSU), share the sensing information. As discussed, a UE may be a vehicle (e.g., UE 450, 451), a mobile device (e.g., UE 452), or another type of device. In some cases, a UE may be a special UE, such as a roadside unit (RSU). FIG. 6 illustrates an example of a V2X system 600 with an RSU 610, in accordance with aspects of the present disclosure. As shown in FIG. 6, a transmitter UE 604 transmits data to an RSU 610 and a receiving UE 602 via sidelink transmissions 612. Additionally or alternatively, the RSU 610 may transmit data to the transmitter UE 604 via a sidelink transmission 612. The RSU 610 may forward data received from the transmitter UE 604 to a cellular network (e.g., gNB) 608 via a UL transmission 614. The gNB 608 may transmit the data received from the RSU 610 to other UEs 606 via a DL transmission 616.

The RSU 610 may be incorporated with traffic infrastructure (e.g., traffic light, light pole, etc.) For example, as shown in FIG. 6, the RSU 610 is a traffic signal positioned at a side of a road 620. Additionally, or alternatively, RSUs 610 may be stand-alone units. In one configuration, the transmitter UE combines sensing information received from a sensing UE with sensing information measured by the transmitter UE if the sensing UE is a special UE, such as an RSU. The sensing information may include information indicating whether the sensing UE is a special UE.

As indicated above, FIGS. 4-6 are provided as examples. Other examples may differ from what is described with respect to FIGS. 4-6.

Figure 7:
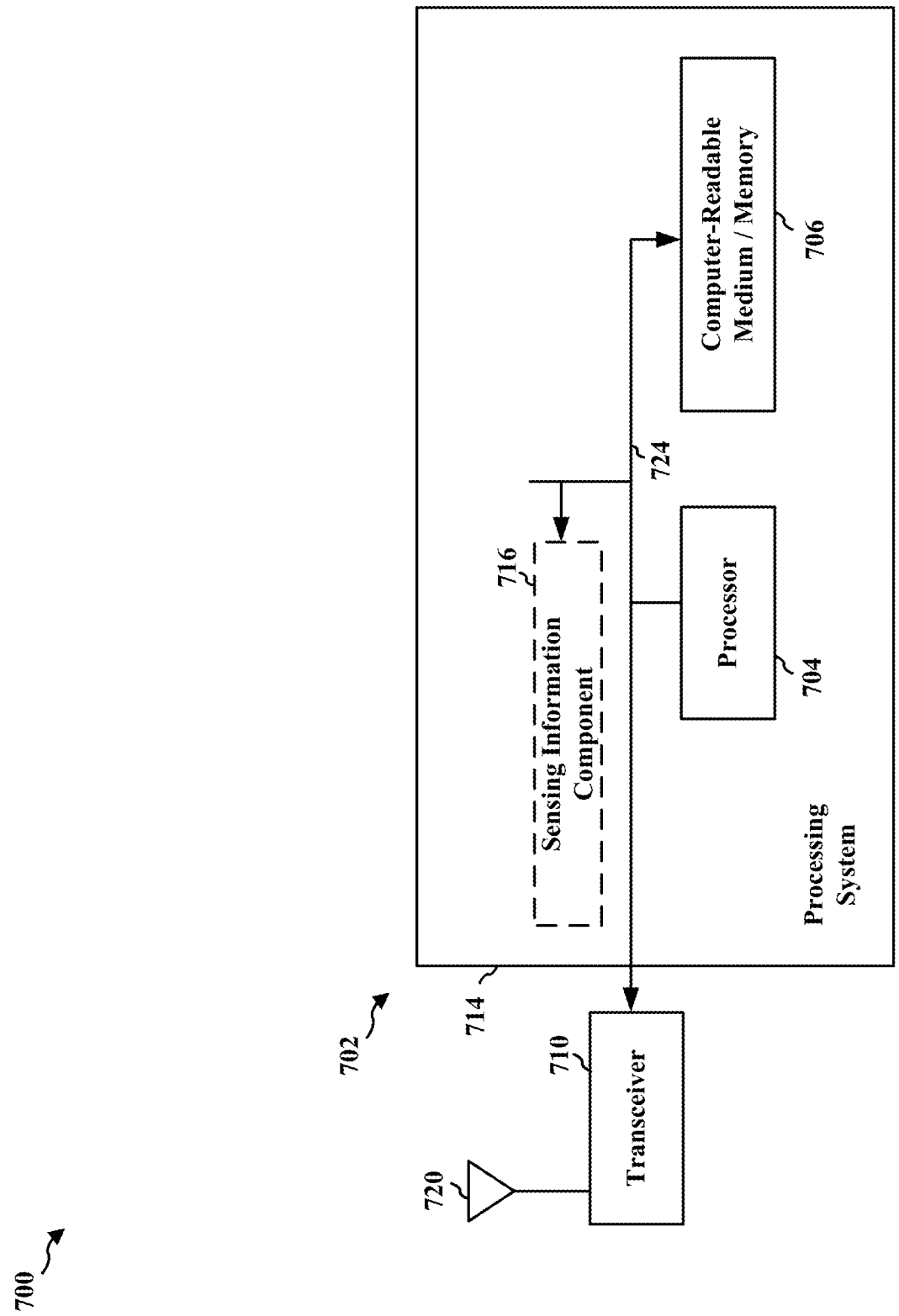
FIG. 7 is a block diagram illustrating an example of a hardware implementation for an apparatus employing a processing system.

FIG. 7 is a diagram 700 illustrating an example of a hardware implementation for an apparatus 702 employing a processing system 714. The processing system 714 may be implemented with a bus architecture, represented generally by a bus 724. The bus 724 may include any number of interconnecting buses and bridges depending on the specific application of the processing system 714 and the overall design constraints. The bus 724 links together various circuits including one or more processors and/or hardware components, represented by a processor 704, a sensing information component 716, and a computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714. In addition, the transceiver 710 receives information from the processing system 714 and based on the received information, generates a signal to be applied to the one or more antennas 720. The transceiver 710 receives sensing information transmitted from one or more partner UEs. The sensing information may be transmitted via a sidelink transmission.

The processing system 714 includes the processor 704 coupled to the computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software.

The processing system 714 further includes at least the sensing information component 716. The sensing information component 716, the transceiver 710, and/or the processor 704 may identify available resources during a sensing window. The sensing information component 716, the transceiver 710, and/or the processor 704 may receive a request to share resource information with another UE (e.g., transmitter UE). The sensing information component 716 and/or the processor 704 may also determine whether the UE (e.g., apparatus 702) associated with the processing system 714 satisfies a sharing condition. The sensing information component 716, the transceiver 710, and/or the processor 704 may share the available resources with the other UE when the UE (e.g., apparatus 702) satisfies the sharing condition.

The component may be software, a component running in the processor 704, resident/stored in the computer-readable medium/memory 706, one or more hardware components coupled to the processor 704, or some combination thereof. The processing system 714 may be a component of the base station 310 and may include the memory 376 and/or at least one of the TX processor 316, the RX processor 370, and the controller/processor 375. Alternatively, the processing system 714 may be the entire base station (e.g., see base station 310 of FIG. 3). The processing system 714 may be a component of the UE 350 and may include the memory 360 and/or at least one of the TX processor 368, the RX processor 356, and the controller/processor 359. Alternatively, the processing system 714 may be the entire UE (e.g., see UE 350 of FIG. 3).

In one configuration, the apparatus 702 for wireless communication includes means for identifying available resources during a sensing window. The apparatus 702 further includes means for receiving a request to share resource information with a second UE. The apparatus 702 still further includes means for determining the first UE satisfies a sharing condition. The apparatus 702 still yet further includes means for sharing the available resources with the second UE when the first UE satisfies the sharing condition. The aforementioned means may be one or more of the aforementioned components of the processing system 714 configured to perform the functions recited by the aforementioned means. As described supra, the processing system 714 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means. The aforementioned means may be one or more of the aforementioned components of the processing system 714 configured to perform the functions recited by the aforementioned means. As described supra, the processing system 714 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

Figure 8:
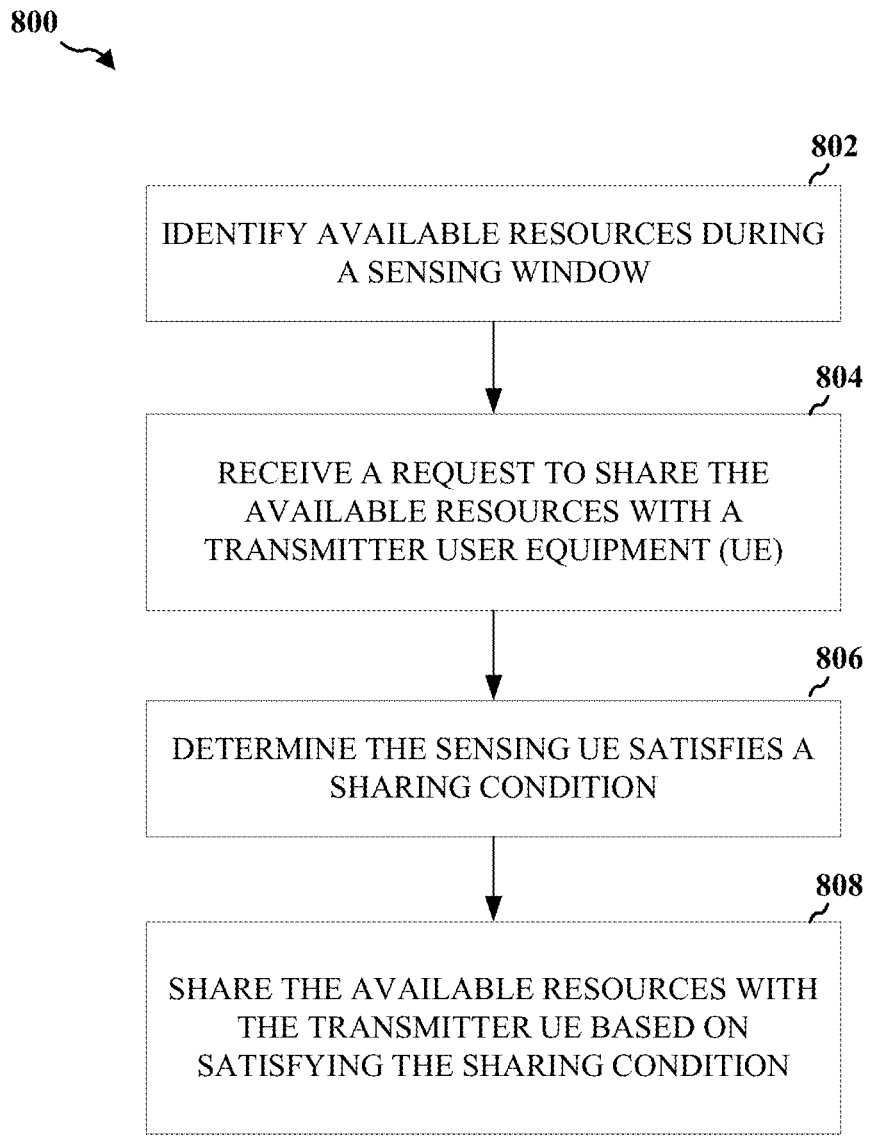
FIG. 8 is a flowchart illustrating a method of wireless communication, performed for example, by a sensing user equipment (UE), in accordance with various aspects of the present disclosure.

FIG. 8 is a flowchart 800 of a method of wireless communication, performed by a sensing user equipment (UE), according to aspects of the present disclosure. In some examples, the sensing UE may be referred to as a partner UE. The sensing UE may be the same as, or different from, a UE receiving sidelink transmissions from the transmitter UE. As shown in FIG. 8, at block 802, the sensing UE identifies available resources during a sensing window. For example, the sensing UE (e.g., using the antenna 352, RX 354, RX processor 356, TX 354, TX processor 368, controller/processor 359, and/or the like) may identify the available resources.

At block 804, the sensing UE receives a request to share the available resources with a transmitter UE. For example, the sensing UE (e.g., using the antenna 352, RX 354, RX processor 356, controller/processor 359, and/or the like) may receive the request to share resource information.

At block 806, the sensing UE determines whether a sharing condition is satisfied with the UE. For example, the sensing UE (e.g., using RX processor 356, TX processor 368, controller/processor 359, and/or the like) may determine whether the sharing condition is satisfied.

At block 808, the sensing UE shares the available resources with the transmitter UE when the sharing condition is satisfied. For example, the sensing UE (e.g., using the antenna 352, TX 354, TX processor 368, controller/processor 359, and/or the like) may share the available resources with the transmitter UE when the sharing condition is satisfied.

Implementation details are described in the following numbered clauses:

1. A method of wireless communication performed by a sensing user equipment (UE), comprising:
   identifying available resources during a sensing window;
   receiving a request to share the available resources with a transmitter UE;
   determining the sensing UE satisfies a sharing condition; and
   sharing the available resources with the transmitter UE based on satisfying the sharing condition.
2. The method of clause 1, further comprising:
   receiving a unicast transmission from the transmitter UE; and
   determining the sensing UE satisfies the sharing condition based on the sensing UE receiving the unicast transmission.
3. The method of any of clauses 1-2, in which the sensing UE is one UE of a set of UEs receiving connection oriented multicast transmissions from the transmitter UE, and the method further comprises determining the sensing UE satisfies the sharing condition based on the sensing UE being one UE of the set of UEs.
4. The method any of clauses 1-3, further comprising:
   receiving a connectionless multicast transmission from the transmitter UE; and
   determining the sensing UE satisfies the sharing condition based on the sensing UE receiving the connectionless multicast transmission.
5. The method of clause 4, further comprising:
   determining a received signal power is greater than a received signal power threshold; and
   determining the sensing UE satisfies the sharing condition based on the received signal power being greater than the received signal power threshold.
6. The method of clause 4, further comprising:
   determining a distance between the sensing UE and the transmitter UE; and
   determining the sensing UE satisfies the sharing condition based on the distance being less than a distance threshold.
7. The method of any of clauses 1-6, further comprising:
   receiving a broadcast transmission from the transmitter UE;
   determining a received signal power is greater than a first received signal power threshold and less than a second received signal power threshold; and
   determining the sensing UE satisfies the sharing condition based on the sensing UE receiving the broadcast transmission and the received signal power being greater than the first received signal power threshold and less than the second received signal power threshold.
8. The method of any of clauses 1-7, further comprising:
   receiving, from a base station, a message designating the sensing UE for sharing; and
   determining the sensing UE satisfies the sharing condition based on the sharing designation.
9. The method of any of clauses 1-8, in which the sensing UE is identified as a roadside unit (RSU), and the method further comprising determining the sensing UE satisfies the sharing condition based on the identification as the RSU.
10. The method of any of clauses 1-9, in which a length of the sensing window is configured via base station signaling.
11. The method of any of clauses 1-10, in which a length of the sensing window is configured for an out-of-coverage operation.
12. The method of any of clauses 1-11, in which the available resources are identified based on a per subchannel availability.
13. The method of any of clauses 1-12, further comprising:
    obtaining the available resources from a resource pool configured for sharing; and
    determining the sensing UE satisfies the sharing condition based on based on obtaining the available resources from the resource pool configured for sharing.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a sensing user equipment (UE), comprising:
identifying available resources during a sensing window;
receiving, from a transmitter UE, a request to indicate the available resources to the transmitter UE;
determining the sensing UE satisfies a sharing condition for sharing the available resources identified during the sensing window, the sharing condition including one or more of a type of transmission received from the transmitter UE, a distance between the sensing UE and the transmitter UE, a received signal power, a UE type of the sensing UE, or a resource pool associated with the available resources; and
transmitting, to the transmitter UE, a message indicating the available resources identified during the sensing window based on satisfying the sharing condition.

2. The method of claim 1, further comprising:
receiving a unicast transmission from the transmitter UE; and
determining the sensing UE satisfies the sharing condition based on the sensing UE receiving the unicast transmission.

3. The method of claim 1, in which the sensing UE is one UE of a set of UEs receiving connection oriented multicast transmissions from the transmitter UE, and the method further comprises determining the sensing UE satisfies the sharing condition based on the sensing UE being one UE of the set of UEs.

4. The method of claim 1, further comprising:
receiving a connectionless multicast transmission from the transmitter UE; and
determining the sensing UE satisfies the sharing condition based on the sensing UE receiving the connectionless multicast transmission.

5. The method of claim 4, further comprising:
determining the received signal power is greater than a received signal power threshold; and
determining the sensing UE satisfies the sharing condition based on the received signal power being greater than the received signal power threshold.

6. The method of claim 4, further comprising:
determining the distance between the sensing UE and the transmitter UE; and
determining the sensing UE satisfies the sharing condition based on the distance being less than a distance threshold.

7. The method of claim 1, further comprising:
receiving a broadcast transmission from the transmitter UE;
determining the received signal power is greater than a first received signal power threshold and less than a second received signal power threshold; and
determining the sensing UE satisfies the sharing condition based on the sensing UE receiving the broadcast transmission and the received signal power being greater than the first received signal power threshold and less than the second received signal power threshold.

8. The method of claim 1, in which:
the sensing condition further includes a base station designating the sensing UE for sharing; and
the method further comprises:
receiving, from the base station, a message designating the sensing UE for sharing; and
determining the sensing UE satisfies the sharing condition based on the base station designating the sensing UE for sharing.

9. The method of claim 1, in which the UE type of the sensing UE is identified as a roadside unit (RSU), and the method further comprising determining the sensing UE satisfies the sharing condition based on the identification as the RSU.

10. The method of claim 1, in which a length of the sensing window is configured via base station signaling.

11. The method of claim 1, in which a length of the sensing window is configured for an out-of-coverage operation.

12. The method of claim 1, in which the available resources are identified based on a per subchannel availability.

13. The method of claim 1, in which:
the resource pool associated with the available resources is configured for sharing; and
the method further comprises determining the sensing UE satisfies the sharing condition based on obtaining the available resources from the resource pool configured for sharing.

14. An apparatus for wireless communications at a sensing user equipment (UE), comprising:
at least one processor;
memory coupled with the processor; and instructions stored in the memory and operable, when executed by the at least one processor, to cause the apparatus:
- to identify available resources during a sensing window;
- to receive, from a transmitter UE, a request to indicate the available resources to the transmitter UE;
- to determine the sensing UE satisfies a sharing condition for sharing the available resources identified during the sensing window, the sharing condition including one or more of a type of transmission received from the transmitter UE, a distance between the sensing UE and the transmitter UE, a received signal power, a UE type of the sensing UE, or a resource pool associated with the available resources; and
- to transmit, to the transmitter UE, a message indicating the available resources identified during the sensing window based on satisfying the sharing condition.

15. The apparatus of claim 14, in which the instructions further cause the apparatus:
- to receive a unicast transmission from the transmitter UE; and
- to determine the sensing UE satisfies the sharing condition based on the sensing UE receiving the unicast transmission.

16. The apparatus of claim 14, in which the sensing UE is one UE of a set of UEs receiving connection oriented multicast transmissions from the transmitter UE, and the instructions further cause the apparatus to determine the sensing UE satisfies the sharing condition based on the sensing UE being one UE of the set of UEs.

17. The apparatus of claim 14, in which the instructions further cause the apparatus:
- to receive a connectionless multicast transmission from the transmitter UE; and
- to determine the sensing UE satisfies the sharing condition based on the sensing UE receiving the connectionless multicast transmission.

18. The apparatus of claim 17, in which the instructions further cause the apparatus:
- to determine the received signal power is greater than a received signal power threshold; and
- to determine the sensing UE satisfies the sharing condition based on the received signal power being greater than the received signal power threshold.

19. The apparatus of claim 17, in which the instructions further cause the apparatus:
- to determine the distance between the sensing UE and the transmitter UE; and
- to determine the sensing UE satisfies the sharing condition based on the distance being less than a distance threshold.

20. The apparatus of claim 14, in which the instructions further cause the apparatus:
- to receive a broadcast transmission from the transmitter UE;
- to determine the received signal power is greater than a first received signal power threshold and less than a second received signal power threshold; and
- to determine the sensing UE satisfies the sharing condition based on the sensing UE receiving the broadcast transmission and the received signal power being greater than the first received signal power threshold and less than the second received signal power threshold.

21. The apparatus of claim 14, in which:
- the sensing condition further includes a base station designating the sensing UE for sharing;
- the instructions further cause the apparatus:
  - to receive, from the base station, a message designating the sensing UE for sharing; and
  - to determine the sensing UE satisfies the sharing condition based on the base station designating the sensing UE for sharing.

22. The apparatus of claim 14, in which the UE type of the sensing UE is identified as a roadside unit (RSU), and the instructions further cause the apparatus to determine the sensing UE satisfies the sharing condition based on the identification as the RSU.

23. The apparatus of claim 14, in which a length of the sensing window is configured via base station signaling.

24. The apparatus of claim 14, in which a length of the sensing window is configured for an out-of-coverage operation.

25. The apparatus of claim 14, in which the available resources are identified based on a per subchannel availability.

26. The apparatus of claim 14, in which:
- the resource pool associated with the available resources is configured for sharing; and
- the instructions further cause the apparatus to determine the sensing UE satisfies the sharing condition based on obtaining the available resources from the resource pool configured for sharing.

27. An apparatus for wireless communications at a sensing user equipment (UE), comprising:
- means for identifying available resources during a sensing window;
- means for receiving, from a transmitter UE, a request to indicate the available resources to the transmitter UE;
- means for determining the sensing UE satisfies a sharing condition for sharing the available resources identified during the sensing window, the sharing condition including one or more of a type of transmission received from the transmitter UE, a distance between the sensing UE and the transmitter UE, a received signal power, a UE type of the sensing UE, or a resource pool associated with the available resources; and
- means for transmitting, to the transmitter UE, a message indicating the available resources identified during the sensing window based on satisfying the sharing condition.

28. A non-transitory computer-readable medium having program code recorded thereon for wireless communications at a sensing user equipment (UE), the program code executed by a processor and comprising:
- program code to identify available resources during a sensing window;
- program code to receive, from a transmitter UE, a request to indicate the available resources to the transmitter UE;
- program code to determine the sensing UE satisfies a sharing condition for sharing the available resources identified during the sensing window, the sharing condition including one or more of a type of transmission received from the transmitter UE, a distance between the sensing UE and the transmitter UE, a received signal power, a UE type of the sensing UE, or a resource pool associated with the available resources; and program code to transmit, to the transmitter UE, a message indicating the available resources identified during the sensing window based on satisfying the sharing condition.

* * * * *